April 13, 1965  A. A. KOISTINEN  3,177,617
FLORAL HOLDER
Filed July 27, 1962  2 Sheets-Sheet 1
Fig. 1
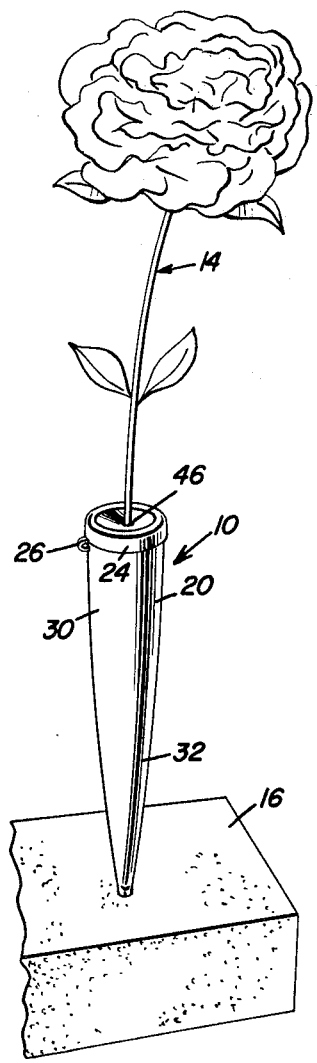
Fig. 2
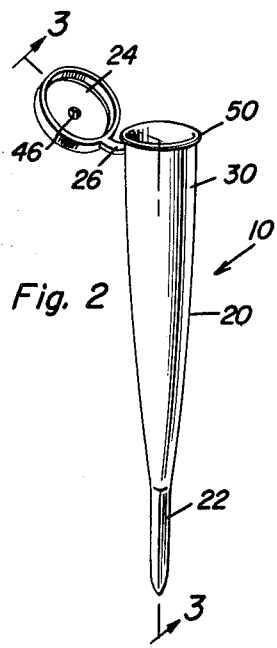
Fig. 3
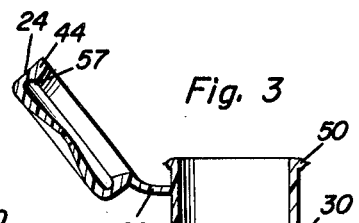
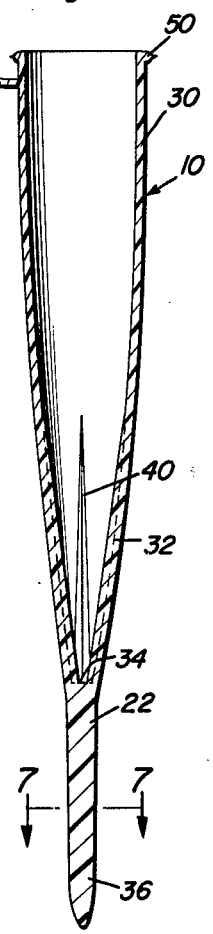
Fig. 4
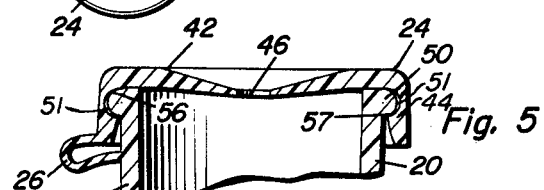
Fig. 6
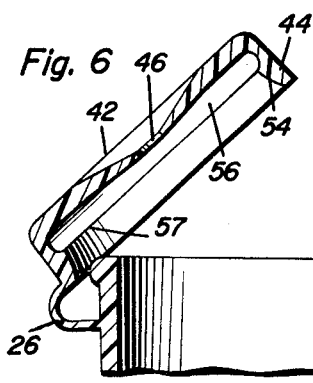
Fig. 5
Fig. 7
Arnold A. Koistinen
INVENTOR.
BY *Clarence A. O'Brien*
and *Harvey B. Jacobson*
Attorneys April 13, 1965  A. A. KOISTINEN  3,177,617
FLORAL HOLDER
Filed July 27, 1962  2 Sheets-Sheet 2
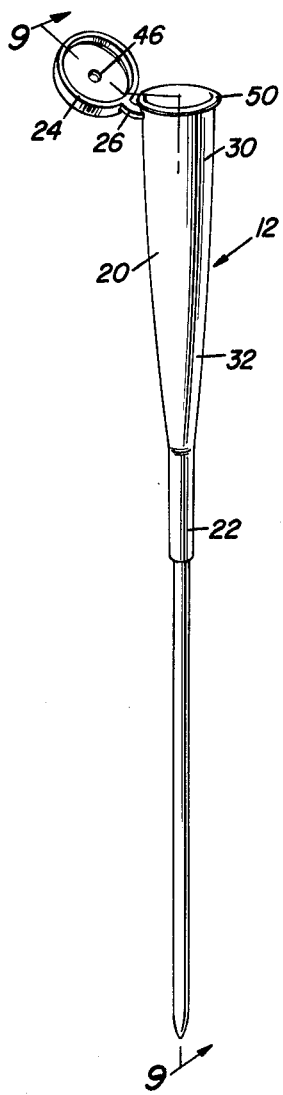
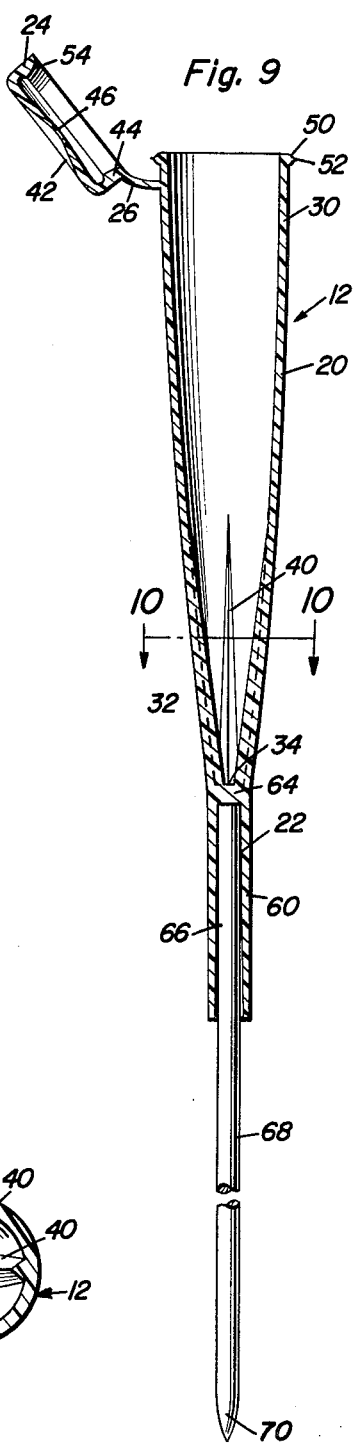
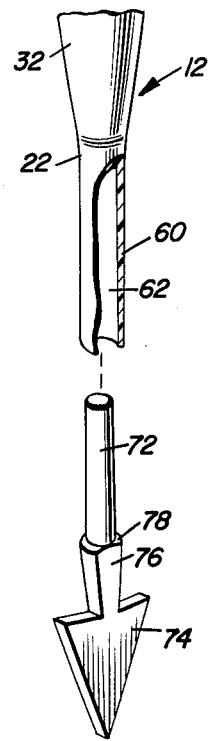
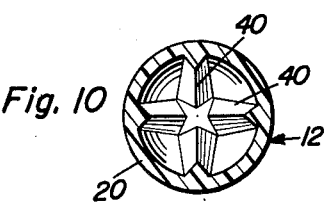
Arnold A. Koistinen
INVENTOR.
BY *Clarence A. O'Brien*
*and Harvey B. Jacobson*
Attorneys

United States Patent Office 3,177,617
Patented Apr. 13, 1965

3,177,617
FLORAL HOLDER
Arnold A. Koistinen, Rte. 1, Box 184, Madison, S. Dak.
Filed July 27, 1962, Ser. No. 212,783
2 Claims. (Cl. 47—41.11)

This invention comprises a novel and useful floral holder and more particularly pertains to a holder for the stems of flowers or plants for supporting and retaining the same in an improved manner.

This application relates to subject matter which is similar to but constitutes an improvement over that disclosed and claimed in my prior Patent No. 2,908,112 of October 13, 1959 for Floral Display Container.

The primary purpose of this invention is to provide a holder for the stem of flowers and plants and which although not limited thereto is especially designed for use by florists and others for more effectively securing the stems of plants in various desired arrangements as for window displays, basket sprays, bouquets, wreaths, centerpieces and the like.

A further important object of the invention is to provide a flower holder in accordance with the foregoing objects which will not only securely grip and hold the stem of the plants therein but will also provide a substantially water-tight container for receiving therein said stems and retaining therein water to thereby increase the life of the plants.

Yet another object of the invention is to provide a flower holder as set forth in the preceding objects which shall include in the flower receiving chamber of the holder vertically elongated longitudinally extending ribs integral with the side walls of the chamber and which shall both serve as a reinforcing and stiffening means for the body of the holder and also as a means for gripping and retaining the stems of plants when placed in the chamber.

A still further object of the invention is to provide a flower holder in conformity with the above mentioned objects which shall include an improved closure cap for the open upper end of the body and which closure cap shall resiliently engage and retain the stems of plants when passed therethrough into the chamber and shall have an improved readily engaged or released sealing and retaining association with the upper periphery of the holder body.

A still further important object of the invention is to provide a flower holder in compliance with the objects set forth hereinbefore which may be readily adapted to either have an integral anchoring spike at its lower end or a removable spike extension therefor.

Still another object of the invention is to provide a floral holder in compliance with the objects above mentioned wherein the holder, its cap and its lower support means may be integrally molded from a suitable plastic such as polyethylene or other elastomeric water impervious material.

An additional object of the invention is to provide a floral holder having incorporated therein means to securely and fixedly retain against rotation the stem of a flower in a predetermined position.

Another important object is to provide a floral holder which will, while fixedly holding the stem of a flower, provide water passages at the wall of the holder chamber permitting the escape of air and the inlet of water at the bottom of the flower stem thereby avoiding air pockets and assuring continuous access of the water in the holder to the plant stem.

Yet another object of the invention is to provide a floral holder with a cap which is imperforate except for a central, flower stem receiving opening whereby the water sealing, flower stem retaining and supporting properties and the resilient strength of the cap will be increased.

A still further important object is to provide a greatly improved resilient locking means between the engaging peripheral portion of a floral holder and its closure cap.

And a final important object of the invention to be specifically enumerated herein resides in the provision of a flower holder having an attractive appearance, of inexpensive construction, possessing an extremely long life, and which shall effectively and securely retain therein the stems of plants for immersion in water.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the manner in which the short stem type of floral holder in accordance with this invention is utilized to support a flower which flower may be of either the long stem or short stem type and which holder is illustrated as mounted in a support block or the like;

FIGURE 2 is a perspective view of the short stem flower holder with the closure cap being open;

FIGURE 3 is a view taken upon an enlarged scale substantially upon the plane indicated by section line 3—3 of FIGURE 2 and showing the internal construction of this form of holder;

FIGURE 4 is a top plan view of the holder of FIGURE 1 but with the flower removed therefrom;

FIGURE 5 is a detail view taken upon an enlarged scale in vertical transverse section substantially upon the plane indicated by section line 5—5 of FIGURE 4 and showing the holder cap in its closed position;

FIGURE 6 is a view similar to FIGURE 5 but showing the holder cap in a partially open position;

FIGURE 7 is a detail view taken substantially upon the horizontal plane indicated by the section line 7—7 of FIGURE 3;

FIGURE 8 is a perspective view of the long stem type of holder in accordance with this invention and shown with the closure cap in open position;

FIGURE 9 is a detail view taken upon an enlarged scale in vertical transverse section substantially upon the plane indicated by section line 9—9 of FIGURE 8, with part of the extension spike of the support means of the holder being broken away;

FIGURE 10 is a horizontal sectional view taken substantially upon the plane indicated by section line 10—10 of FIGURE 9 and showing the internal construction of the holder body, this construction being also identical with that of the preceding form of the invention; and FIGURE 11 is a fragmentary perspective view of parts being broken away of the lower end of the floral holders of FIGURES 8 and 9 but showing a modified construction of spike for use therewith.

In the accompanying drawings there is indicated generally by the numeral 10 a short stem type of floral holder while the numeral 12 generally indicates a long stem or extension spike type of holder and except for the difference in the support means by which the two forms of holders are secured or mounted in various ways, the constructions of the holders are identical. It is to be understood that both the short stem holder of FIGURES 1–7 and the long stem or extension spike holder of FIGURES 8–11 are each adapted to receive therein either short or long stem flowers or plants.

As shown in FIGURE 1, the holder is usefully employed to removably receive and releasably retain therein the stem of a plant 14 such as a flower or the like so that the stem will be received in the hollow interior of the body of the holder and may be immersed in water to thereby increase the life of the plant. The lower end of the holder includes a support of either the short stem or the long stem or spike extension type which may be inserted in any suitable support means such as a block 16 or the like whereby the holder and the plant carried thereby may be positioned at various attitudes as desired.

The short stem and long stem type of holders 10 and 12 are generally of the same construction set forth in my above identified prior patent, consisting of the body 20 having at its lower end a support 22 together with a closure cap 24 which is preferably integrally secured to the body open top as by a connecting strap 26. However, it is also within the intent of this invention to provide the closure cap 24 as a completely separate and detachable element from the body 20, if desired. As in the construction of my prior patent, the material of the cap, body and support whether of the short stem or long stem type, is made of a suitable water impervious material. For this purpose an elastomeric plastic such as polyethylene is bound to be highly satisfactory, from the standpoint of economy and satisfactory performance.

Although the components of the two forms of holders set forth herein generally resemble the corresponding forms of the short stem and long stem holders disclosed and claimed in my above patent, the present construction exhibits a number of refinements and improvements thereover to be hereinafter set forth.

Attention is directed first to an understanding of the construction of the short stem type of holder 10 illustrated in FIGURES 1-6 of the drawings, it being understood that the features and constructions referred to therein except for the difference in the support 22 are identical with that of the long stem form 12 of FIGURES 8-11.

The body 20 of the holders 10 or 12 comprise each a vertically elongated tubular member having an open upper end and whose upper portion 30 (see FIGURE 3) is generally cylindrical while its lower portion is downwardly convergent to provide a conical or conoidal lower portion 32. There is thus provided a correspondingly shaped chamber in the interior of this body which chamber is open at its upper end. The chamber includes a bottom wall indicated at 34 and projecting downwardly from the body below the chamber is the support 22. In this form of the invention the support consists of a single elongated spike which as shown in FIGURE 7 and as indicated by the numeral 36 comprises a spike which is of rectangular or square cross section, although in some instances other polygonal cross sectional shapes may be employed if desired.

The square cross-sectional shape of the spike produces the following important advantages: (1) it prevents the holder from turning in its support, thereby maintaining a predetermined positioning of the flower; (2) it affords more surface area for securing the holder in its support; (3) it gives a much needed bracing of the plastic material of the holder at the four corners of the spike.

An important improved feature of this invention over the prior construction of my prior patent is that the interior of the lower portion of the chamber is provided with a plurality of vertically elongated longitudinal ribs 40, see FIGURE 10 which may conveniently be of triangular cross section with their apices towards the interior of the chamber as shown in FIGURE 10, and which extends upwardly from the bottom wall 34 and project interiorly from the side wall of the lower portion 32 for a convenient distance up into the chamber. These ribs serve the dual function of reinforcing the relatively thin elastomeric material of the lower portion of the hollow body and its junction with the support 22 and also serve as a means to wedgingly receive and retain therebetween the stems of plants 14 when placed therein.

Still further, the lower ends of the ribs 40 wedgingly grip or embrace the lower ends of the flower stems preventing turning of the latter from their inserted positions while additionally preventing the trapping of air or the formation of an air pocket at the ends of the flower stems which would prevent the water from entering the stems.

As in the construction shown in my prior patent, the open upper end of the tubular body is provided with a closure cap 24. This cap, as above mentioned, may in some instances be separate but in general is preferably integrally molded with or is homogeneously or otherwise fixedly and permanently secured to the open upper end of the body. As will be best apparent from a consideration of FIGURES 3, 5 and 6, the cap 24 includes a top wall 42 of sufficient shape and area to overlay the upper periphery of the open upper portion 30 of the body. The periphery of the top wall 42 has a depending annular flange 44 projected downwardly therefrom, and this flange is integrally united by the previously mentioned strap 26 to the upper portion 30 of the body 20. This construction permits the cap to readily move from the closed position shown in FIGURE 5 to the open position shown in FIGURE 6.

As shown more clearly in FIGURES 1 and 4, the top wall 42 of the cap consists of a circular disk or diaphragm which is provided with a central opening 46 to receive and resiliently embrace the stems of flowers inserted therethrough, so that these stems may be thrust through the cap and thus into the chamber of the hollow body, whereby the cap will assist the ribs 40 in firmly securing, retaining and holding the stem of the plant in a relatively fixed position. The diaphragm then provides a very satisfactory water tight seal or closure for the open top of the holder.

Alternatively, however, in some instances this top wall may, as shown in my prior patent, have radial slits extending outwardly from the central opening 46 in order to provide segmental or triangular shaped resilient fingers therebetween.

As shown in FIGURE 6 in particular, the top wall 42 of the cap 24 is tapering or of a progressively decreasing thickness from its rim to its aperture 46. This increases the flexibility of the cap at the periphery of the opening 46 effecting an improved resilient sealing engagement with the flower stems. At the same time increased strength is obtained at the juncture of the thickened top wall with the rim of the cap, increasing its structural strength and resistance to tearing.

The top surface of the top wall 42 is depressed, providing a conical surface which is inclined downwardly at an angle of about 20° to the plane which is defined by the top surface of the cap rim.

A further novel and important feature of the invention as disclosed in this application resides in the cooperating structure of the upper portion 30 of the hollow body and the cooperating structure of the cap 24. Thus, as shown best in FIGURE 6, the upper portion of the body 20 is provided with an annular outwardly projecting bead or rib 50 which at its medial portion is provided with an annular outwardly projecting rib 52. This rib is of very thin material and is readily flexible, and preferably is produced by causing the mold sections by which the body is formed to separate in a plane which contains this rib.

The flange 44 of the cap is of relatively increasing thickness from its open or lower edge upwardly toward the top wall 42 as will be apparent from FIGURES 5 and 6, thus producing a tapered or beveled internal surface 54 which facilitates movement of the cap from its open position in FIGURE 6 to its closed position in FIGURE 5 downwardly upon the bead 50 and rib 52. There is sufficient flexibility in the rib and/or the body to enable enough deformation of either or both of these members to cause the inclined surface 54 to slide over the bead and permit the bead to then be received in the internal circumferentially extending locking groove or channel 56 formed in the flange 44. As will be seen in FIG- URE 6, the intersection of the conical beveled surface 54 with the annular groove 56 defines a relatively sharp V-shaped edge or lip 57 which resiliently cooperates with the bead 50 to increase the resilient retention of the cap upon the body.

Preferably the cross sectional body of the bead 50 will be of slightly greater radius than that of the channel 56 in order to provide two distinct annular areas of contact above and below the space 51 between the engaging surfaces of the bead and channel, thereby increasing the effectiveness of the seal between cap and body.

In its preferred form, the embodiment previously described is of one-piece construction and is of an elastomeric, plastic, water impervious material. It is however possible to utilize certain of the above described features of this invention in floral holders in which the cap may be completely separable from the body or may be omitted altogether. Further, the improved specific structure of the cap and its attachment to the body may be utilized with the internal ribs 40 being omitted. Further, although it is preferred that the cap, body, retaining strap for the cap and the support be of one-piece construction, it is evident that these elements may be one or more separately formed and of different materials.

Turning now to the embodiments of FIGURES 8–12, it will be noted that there is disclosed therein a flower holder of the long stem type. The body construction of this holder is identical to that previously described and therefore the same numerals have been applied to corresponding parts thereof. The difference of structure set forth in this form of the invention resides in the support 22. This support consists of a tubular extension 60 having a hollow axial bore 62 opening from the bottom end thereof and extending upwardly towards the partition 64 which separates this bore from the bottom wall 34 of the chamber in the body. Detachably received in the bore 62 of this extension 60 is the upper or shank portion 66 of an extension spike 68. This latter may be provided with the usual point 70 and the extension spike 68 is of such suitable length as to enable the floral holder to be positioned in any desired elevated and spaced attitude with respect to the supporting base. The bore 62 has a slight taper in order to effect a frictional retaining of the spike 62 and also to accommodate spikes of varying and various thicknesses and shapes.

Alternatively, however, there is provided an extension spike of the type shown in FIGURE 11 in which there is employed a shank 72 frictionally receivable in the bore 62 of the extension 60 and which shank terminates at its lower end and a flat plate-like member 74. This latter includes a neck portion 76 providing at its junction with the shank 72 a flat laterally extending surface 78 which is adapted to abut against the lower end of the extension 68. The member 74 is preferably given the configuration of an arrowhead as shown in FIGURE 11. It will be appreciated, however, that other suitable barbed shapes may be utilized if desired.

The purpose of this extension is to facilitate the very secure attachment of the holder and its support as when flowers or plants are to be incorporated into floral wreaths, or other flower arrangements of various types.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A flower holder comprising a vertically elongated water impervious body having therein a plant stem receiving chamber open at the top of said body, said body including a support for anchoring and mounting said holder, a closure cap for the open upper end of said body, said cap having a resilient top wall imperforate except for an opening for insertion of said plant stem therethrough, said cap and body being of a resiliently yieldable material and having cooperating portions establishing a releasable watertight seal and a closure retaining means including an annular groove and bead, said groove and bead being each of arcuate cross-section with the radius of curvature of the bead being greater than that of said groove and the material of the cap being sufficiently yieldable that a pair of annular seating engagements spaced from each other is provided between said bead and groove, said cap top wall having a peripherally depending flange below said groove releasably embracing said body open upper end, said flange being of progressively increasing thickness from its free edge to said cap top wall and having a conically beveled inner surface facilitating engagement of the cap over said bead and upon said body.

2. A flower holder comprising a vertically elongated liquid impervious body having a chamber therein open at the top of said body for receiving the stem of a flower or plant, said chamber having a bottom wall and a side wall whose lower portion is downwardly convergent to said bottom wall, said body below said chamber having a downwardly extending support for anchoring and mounting said holder, said body having a closure cap for said chamber open top including a top wall of a resilient material which is imperforate except for a central opening centered above said bottom wall, said opening having a smoothly and continuously curving unbroken rim for resiliently embracing the stem of a plant, said closure wall being of progressively increasing thickness from the rim of said central opening therefrom to said closure top wall outer edge thereby providing the maximum resilience at said opening and the maximum strength at said outer edge and means releasably retaining said closure cap in embracing and closing position upon the open upper end of said body cooperating portions on said cap and body being of a resiliently yieldable material and establishing a releasable watertight seal and a closure retaining means for said body including an annular groove and bead, said groove and bead being each of arcuate cross-section with the radius of curvature of the bead being greater than that of said groove and having a radial clearance between the peripheries of said bead and groove and providing thereby a pair of annular seating engagements between the top and bottom surfaces of said bead with the corresponding surfaces of said groove, said cap top wall having a peripherally depending flange below said groove releasably embracing said body open upper end, said flange being of progressively increasing thickness from its free edge toward said cap top wall and having a conically beveled inner surface facilitating engagement of the cap over said bead and upon said body.

References Cited by the Examiner

UNITED STATES PATENTS

| 674,116 | 5/01 | Kift | 47—41.5 |
| 967,029 | 8/10 | Mygatt. | |
| 1,357,732 | 11/20 | Schimmel | 47—41.5 |
| 1,732,213 | 10/29 | Alland | 47—41.5 |
| 2,691,849 | 10/54 | Ehlers | 47—41.5 |
| 2,753,991 | 7/56 | Sherman | 206—56 |
| 2,908,112 | 10/59 | Koistinen | 47—41.5 |

FOREIGN PATENTS

| 411,838 | 1/10 | France. |
| 87,733 | 10/36 | Sweden. |

T. GRAHAM CRAVER, *Primary Examiner.*